(12) United States Patent
Ericksen et al.

(10) Patent No.: US 10,113,604 B2
(45) Date of Patent: Oct. 30, 2018

(54) SUSPENSION DAMPER

(71) Applicant: Fox Factory, Inc., Scotts Valley, CA (US)

(72) Inventors: Everet Owen Ericksen, Santa Cruz, CA (US); Christopher Paul Cox, Capitola, CA (US); Wesley E. Allinger, Santa Cruz, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

(21) Appl. No.: 13/794,332

(22) Filed: Mar. 11, 2013

(65) Prior Publication Data

US 2013/0234378 A1 Sep. 12, 2013

Related U.S. Application Data

(60) Provisional application No. 61/609,055, filed on Mar. 9, 2012.

(51) Int. Cl.
| | |
|---|---|
| *F16F 9/34* | (2006.01) |
| *B60G 13/06* | (2006.01) |
| *F16F 9/19* | (2006.01) |
| *B60G 15/06* | (2006.01) |
| *F16F 9/348* | (2006.01) |

(52) U.S. Cl.
CPC ............ *F16F 9/3405* (2013.01); *B60G 13/06* (2013.01); *B60G 15/062* (2013.01); *F16F 9/19* (2013.01); *F16F 9/3481* (2013.01)

(58) Field of Classification Search
CPC .......... F16F 9/32; F16F 9/3207; F16F 9/3214; F16F 9/34; F16F 9/48; F16F 9/469; F16F 9/516; F16F 15/023; F16F 15/04; F16F 2222/12; F16F 9/3405; F16F 9/3481; F16F 9/19; B60G 13/06; B60G 15/062

USPC .. 188/313, 316, 317, 322.13, 322.15, 282.1, 188/282.5, 282.6; 137/454.5, 494, 512, 137/512.3; 251/356, 360

See application file for complete search history.

(56) References Cited

U.S. PATENT DOCUMENTS

| | | | | |
|---|---|---|---|---|
| 3,040,667 | A | * | 6/1962 | Shaffer .......................... 417/331 |
| 4,620,694 | A | * | 11/1986 | Padgett ...................... 267/64.15 |
| 5,404,973 | A | * | 4/1995 | Katoh et al. ................ 188/282.1 |
| 6,131,709 | A | * | 10/2000 | Jolly et al. ................. 188/267.2 |
| 6,390,257 | B1 | * | 5/2002 | Naples ..................... 188/322.15 |
| 6,460,664 | B1 | * | 10/2002 | Steed et al. ............. 188/322.15 |
| 7,374,028 | B2 | | 5/2008 | Fox |
| 8,794,406 | B2 | | 8/2014 | De Kock |
| 2005/0061592 | A1 | * | 3/2005 | Heyn et al. ................. 188/282.3 |
| 2006/0016495 | A1 | * | 1/2006 | Strauss et al. ............ 137/625.65 |
| 2008/0179795 | A1 | * | 7/2008 | Fox ............................ 267/64.11 |

(Continued)

FOREIGN PATENT DOCUMENTS

FR 2617928 A1 * 1/1989

*Primary Examiner* — Melody M Burch

(57) ABSTRACT

A vehicle damper comprises a fluid filled cylinder, a piston for movement within the cylinder, at least two fluid ports formed in the piston and at least one shim at least partially blocking the ports. In one embodiment, a fluid collection area is formed between the ports and the shim, the collection area permitting communication between fluid in the ports. In another embodiment, the piston includes at least one aperture constructed and arranged to receive a threaded bleed valve.

19 Claims, 9 Drawing Sheets

(56) References Cited

U.S. PATENT DOCUMENTS

2009/0057080 A1* 3/2009 Deferme ............... F16F 9/3488
                                                188/313
2009/0277734 A1   11/2009 Cox et al.
2011/0180361 A1*  7/2011 De Kock ................ F16F 9/062
                                                188/269

* cited by examiner

SUSPENSION DAMPER

BACKGROUND OF THE INVENTION

Field of the Invention

Embodiments of the invention generally relate to a damper assembly for a vehicle. More specifically, certain embodiments relate to valves used in conjunction with a vehicle damper.

Description of the Related Art

Vehicle suspension systems typically include a spring component or components and a dampening component or components. Typically, mechanical springs, like helical springs, are used with some type of viscous fluid-based dampening mechanism and the two are mounted functionally in parallel. In some instances, features of the damper or spring are user-adjustable. What is needed is an improved method and apparatus for varying dampening characteristics in a shock absorber.

SUMMARY OF THE INVENTION

The present invention generally relates to a vehicle damper comprising a fluid filled cylinder, a piston for movement within the cylinder, at least two fluid ports formed in the piston and at least one shim at least partially blocking the ports. In one embodiment, a fluid collection area is formed between the ports and the shim, the collection area permitting communication between fluid in the ports. In another embodiment, the piston includes at least one aperture constructed and arranged to receive a threaded bleed valve.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As used herein, the terms "down," "up," "downward," "upward," "lower," "upper" and other directional references are relative and are used for reference only. Certain features of dampers, including damping pistons, are shown and described in U.S. Pat. No. 7,374,028, which is incorporated herein, in its entirety, by reference. The operation of a fluid damper is further described in detail in US Patent Publication No. 2009/0277734 A1 and that publication is incorporated by reference herein in its entirety.

Figure 1:
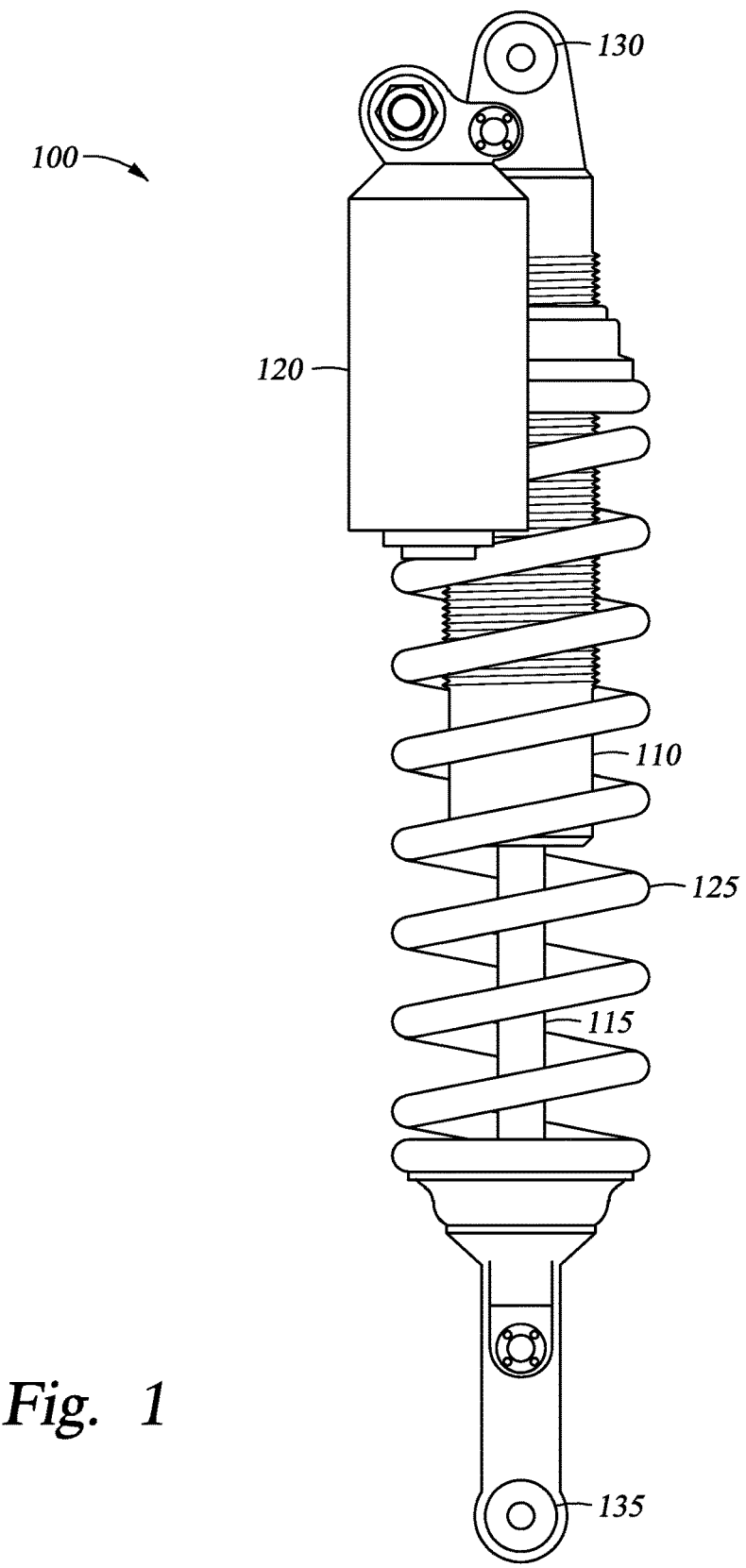
FIG. 1 is a perspective view of a fluid damper for a vehicle.

FIG. 1 is a perspective view of a shock absorber 100 for a vehicle. The shock absorber includes a fluid damper having a body 110 with a rod 115 extending therefrom and a reservoir 120 in fluid (e.g. damping fluid such as hydraulic oil) communication with the damper body. The shock absorber 100 further includes a helical spring 125 annularly disposed about the damper body and captured axially between an upper and lower end of the damper body. Typically, shock absorbers like the one shown in FIG. 1 are installed on a vehicle with an upper end 130 connected to the vehicle frame and a lower end 135 connected to the vehicle suspension. In operation, a piston (not shown) mounted on the rod meters fluid between a compression and rebound side of the damper body. In a compression stroke, as the rod 115 moves into the body 110, displaced fluid travels from the body to the reservoir 120. In a rebound stroke, the operation takes place in reverse. The spring is constructed and arranged to provide position sensitive resistance as the shock absorber compresses.

Figure 2:
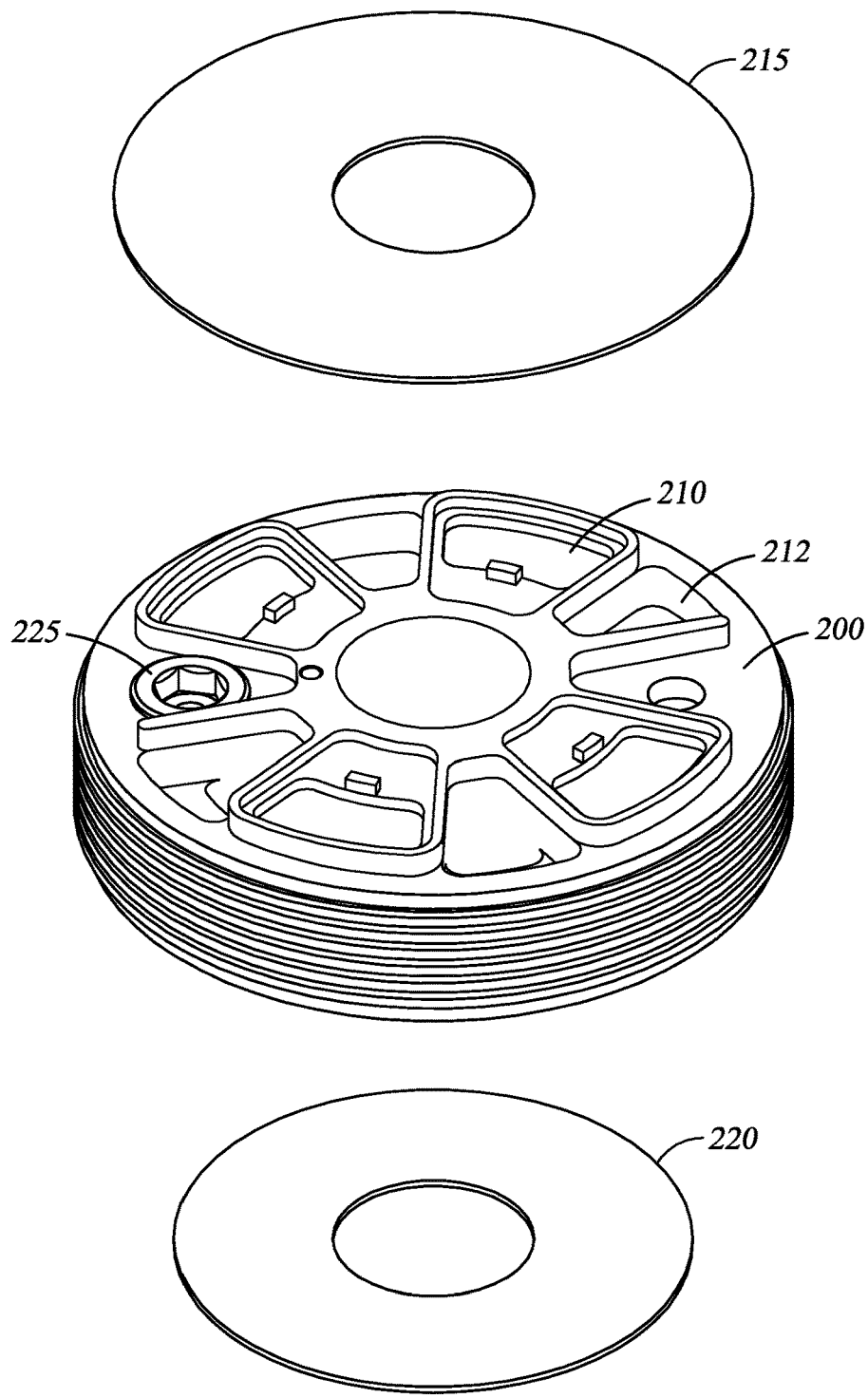
FIG. 2 is an exploded view of a piston for a fluid damper according to one embodiment.

FIG. 2 is an exploded view of a piston 200 for a fluid damper according to one embodiment. The piston includes compression ports 210 that are radially disposed around the piston and serve to permit fluid to travel through the piston in a compression stroke of the damper. A compression shim or shims 215 serve to meter the fluid as it passes from the piston to a rebound side of the damper body. A similar arrangement exists on an opposite side of the piston and in a rebound stroke, fluid is metered by a separate shim or shims 220 as exits rebound ports 212 (the underside of which are visible in FIG. 2). The piston 200 and each shim 215, 220 have a central bore for receiving a piston shaft (not shown). The piston of FIG. 2 is a "dual bleed" valve piston having an independent bleed valve for each of the compression and rebound damping fluid flow. In FIG. 2, the compression bleed valve 225 is shown.

Figure 3:
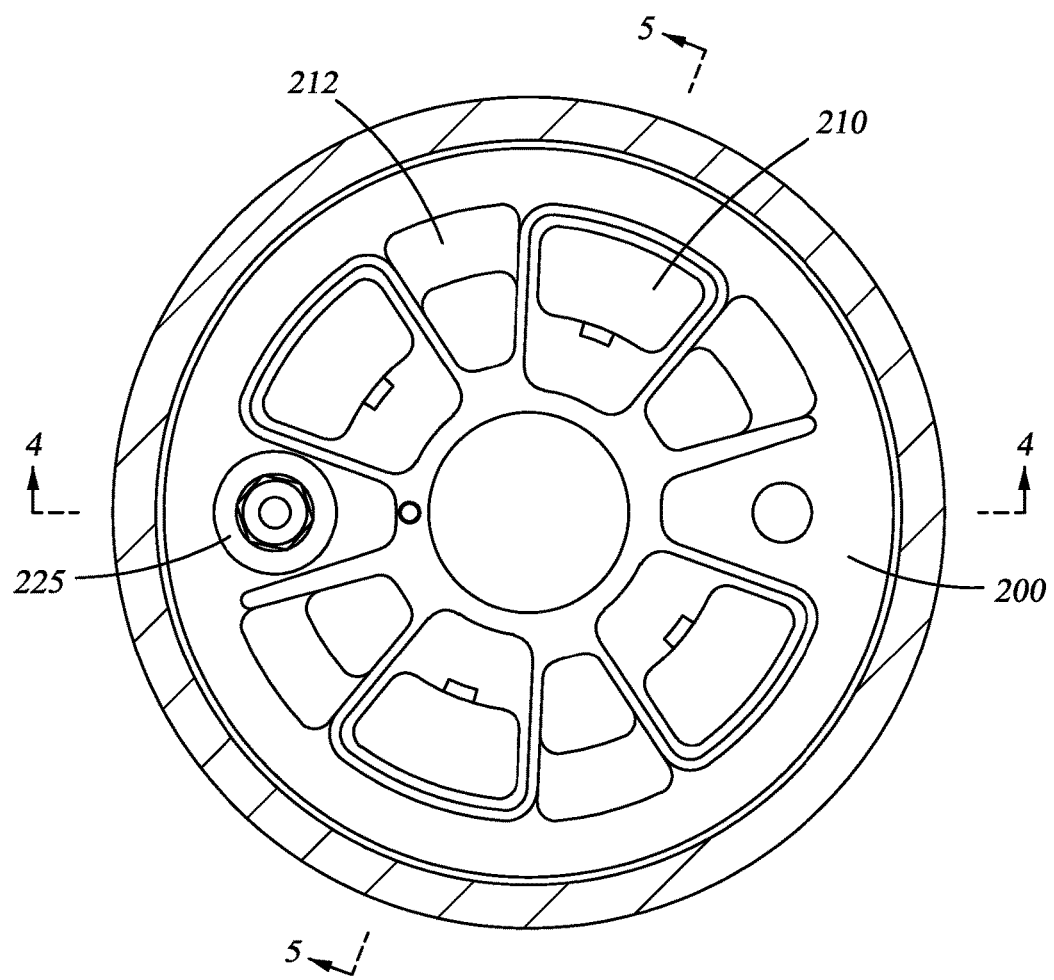
FIG. 3 is a top view of the piston of FIG. 2, shown installed in a damper body.

FIG. 3 is a top view of the piston of FIG. 2, shown installed in a damper body.

Figure 4:
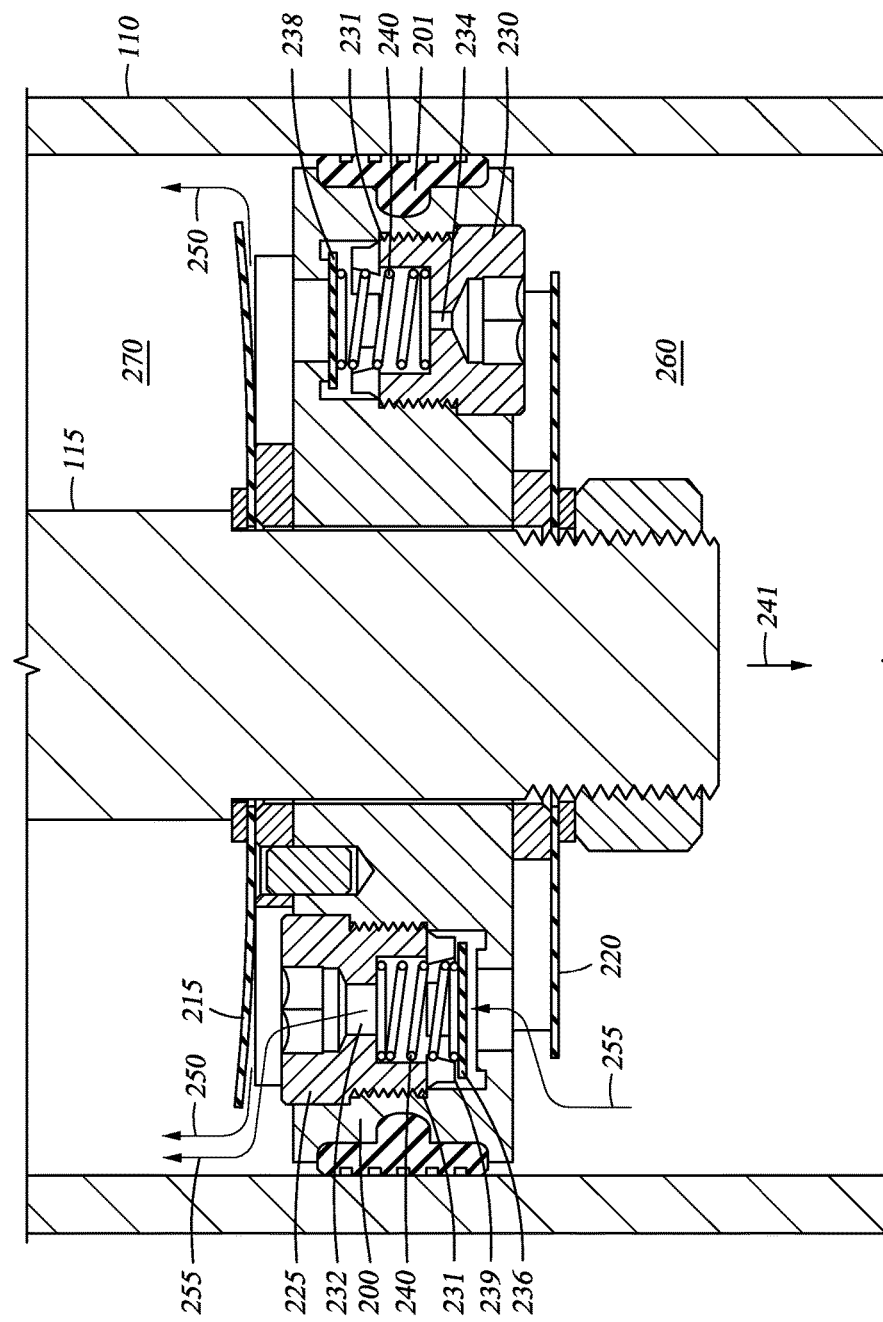
FIG. 4 is a section view of the piston of FIG. 3, taken at a line 4-4 and shown in a damper body.

FIG. 4 is a section view of the piston of FIG. 3, taken at a line 4-4 and shown in a damper body 110. As is typical, the piston 200 is sealed in the damper body with a sealing member 201 and reciprocates between a compression 260 and rebound 270 side of the body 110, metering fluid as it travels. The piston 200 includes a pair of threaded apertures whereby each of the compression 225 and rebound 230 bleed valves are threaded into the piston body to form a threaded connection 231 therebetween. The purpose of the bleed valves 225, 230 is to pass a predetermined volume of fluid in the compression and rebound strokes without interference from the shims that meter fluid passing through compression and rebound ports. For example, in the compression stroke shown in FIG. 4 (and notated by directional arrow 241), compression shim flow 250 as well as compression bleed flow 255 are each shown passing through the piston 200. The diameter of each valve orifice 232, 234 may vary between the compression 225 and the rebound 230 valves, thereby allowing for the damper to be tuned with different bleed rates in rebound versus compression.

Considering the bleed valves in greater detail, a compression check plate 236 checks fluid flow (e.g. substantially blocks) from the rebound side 270 to the compression side 260 of the piston body 110 while a rebound check plate 238 checks fluid flow (e.g. substantially blocks) from the compression side to the rebound side of the piston body. Each check plate is biased toward engagement with a plate sealing surface 239 of the piston body by an energizing spring 240. In the embodiment shown, the piston is constructed and arranged whereby the bleed values may be chosen and inserted to meet the needs of a particular user with no need to enlarge a fixed aperture in the piston 200 through drilling. In one example, sizes range between 0.0025" and 0.150" with each 0.005" increase resulting in a 15% incremental increase in flow area through the valve.

As illustrated by the directional arrow 241, the piston in FIG. 4 is moving in a compression stroke. Consequently, fluid pressure on compression check plate 236 has depressed energizing spring 240 and opened the bleed valve 225 to the flow of fluid therethrough. Importantly, the flow of fluid through the bleed valves 225, 230 is unencumbered by the shims 215, 220 as the shims are arranged to act only on fluid flowing through the compression 210 and rebound 212 ports (see FIG. 5). As illustrated, the flow path from the bleed valves 225, 230 takes place at a lower elevation than the separate, shimmed flow path through the compression 210 and rebound 212 ports. FIG. 2 also illustrates the difference in relative height between the fluid exiting from the bleed valve 225 and the exiting fluid from compression port 210.

Figure 5:
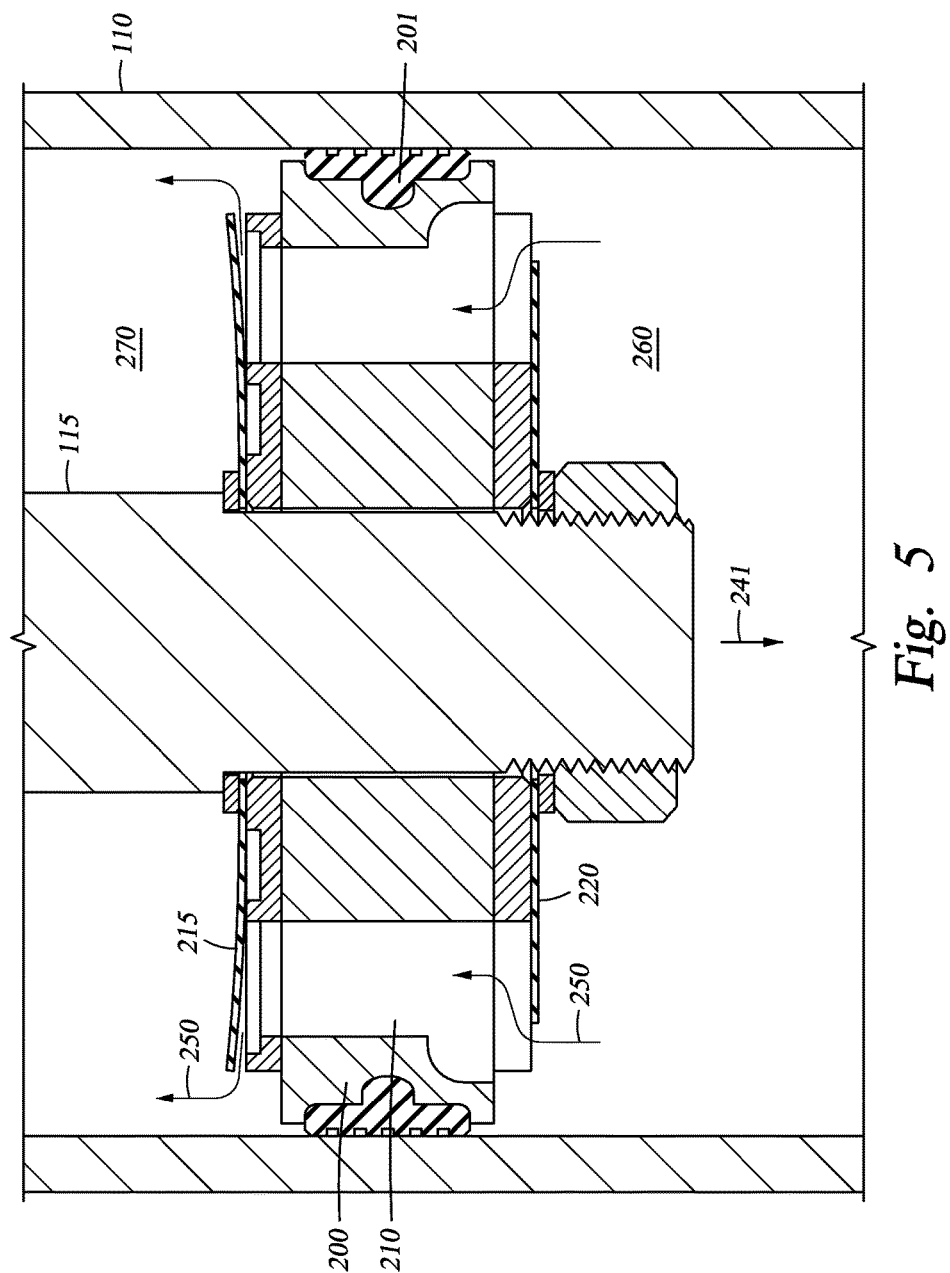
FIG. 5 is a section view of the piston of FIG. 3, taken at a line 5-5 and shown in a damper body.

FIG. 5 is a section view of the piston of FIG. 3, taken at a line 5-5 and shown in a damper body 110. FIG. 5 shows the operation of the compression ports 210 and the fluid path 250 through them which is blocked by compression shims 215 until enough pressure is developed to deflect and open the shims. While the shims are shown as a single plate-like unit, they may optionally comprise multiple shims (as shown, for instance, in FIG. 8). In a rebound stroke of the piston, the rebound sealing shim 220 checks damping fluid flow from the rebound side 260 to the compression side 270. Either or both of the compression and rebound shims may be completely circumferential or partially circumferential to cover only certain flow ports (e.g. "clover leafed").

Figure 6:
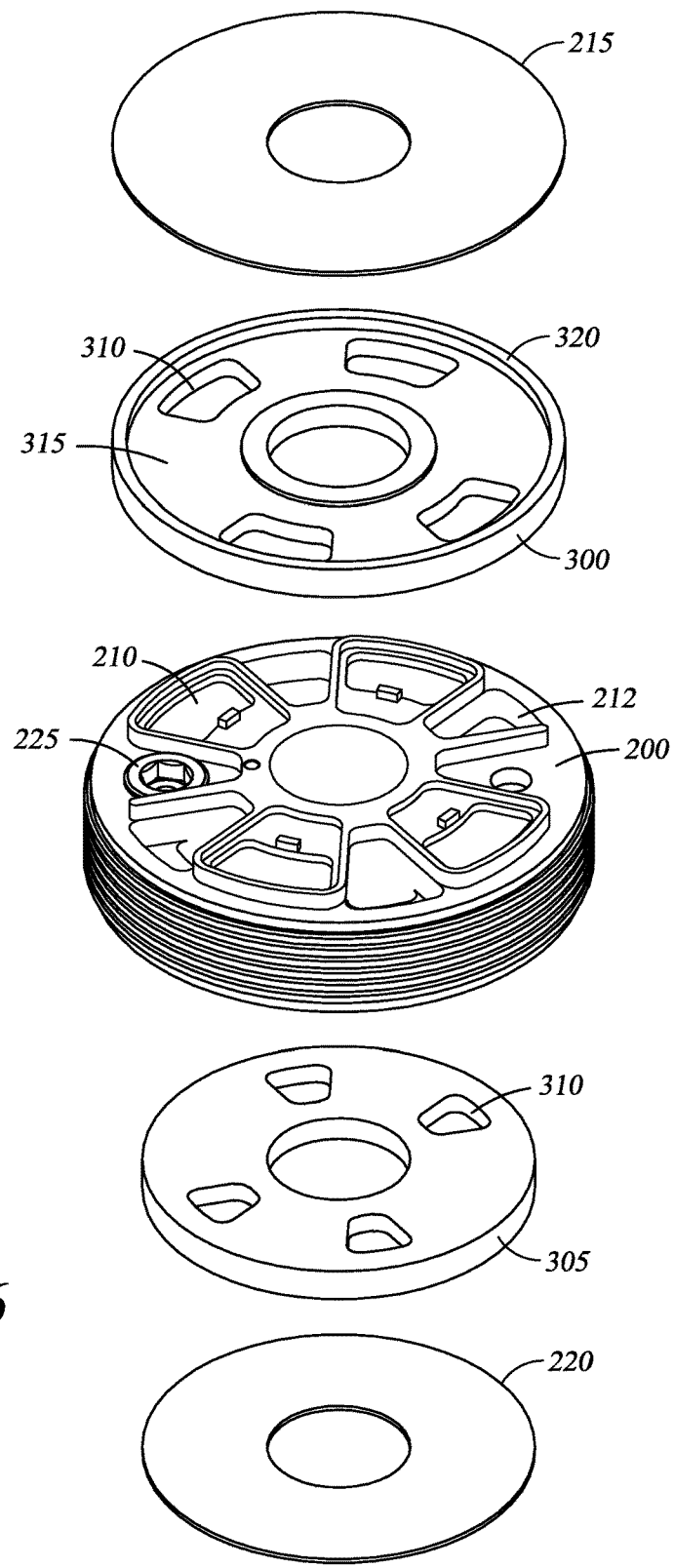
FIG. 6 is an exploded view of a piston for a fluid damper according to another embodiment.

FIG. 6 is an exploded view of a piston for a fluid damper according to another embodiment. The piston 200 of FIG. 6 includes plates 300, 305 installed at an upper and lower side of the piston, between the compression ports 210 and the shim 215 on a compression side and between rebound ports 212 and shim 220 on a rebound side. The purpose of the plates 300, 305 is to create a digressive damping characteristic when using the so-equipped piston 200. As shown, each plate 300, 305 includes four radially spaced apertures 310 that are constructed and arranged to be aligned with the ports of the piston. In operation, fluid entering the plate through any port is permitted to collect in a fluid collection area 315 formed in each plate. Because the shims sit on a sealing edge of the plates, the fluid forms a pool-like mass and acts upon the shim uniformly over its entire exposed area, rather than only at specific points where the ports are located. Such more even distribution results in a more distributed opening force along the circumference of the shim providing a more complete opening at opening pressure. Because the valve opens more completely, more damping fluid tends to be allowed through and the corresponding damping rate drops off markedly. For example, operation of a damper with the embodiment of FIG. 6 can result in an initially steep dampening curve which flattens considerably as the shimmed piston valve opens and the collected pool of fluid is released. The embodiment of FIG. 6 includes the previously explained bleed valves but it will be understood that the bleed valves and digressive plates can be used together or separately.

Figure 7:
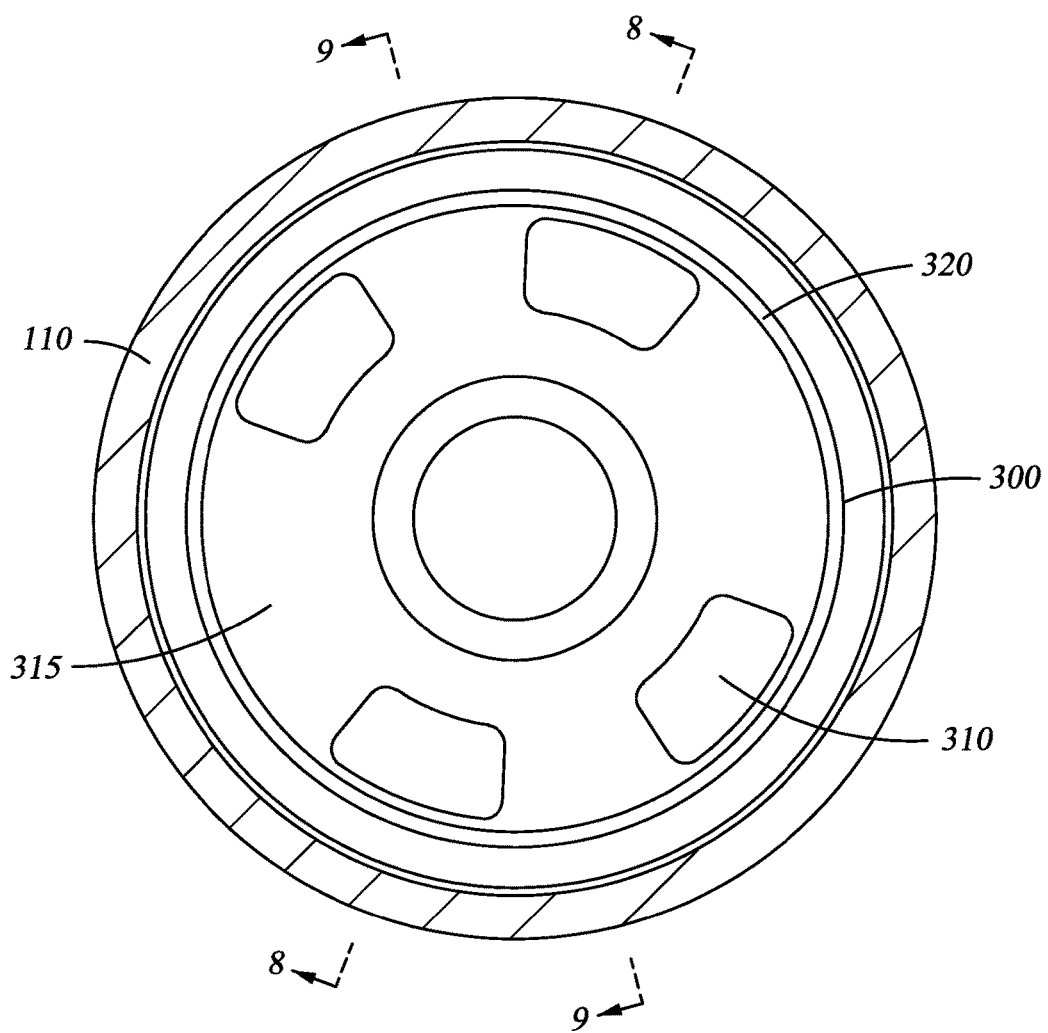
FIG. 7 is a top view of the piston of FIG. 6, shown installed in a damper body.
Figure 8:
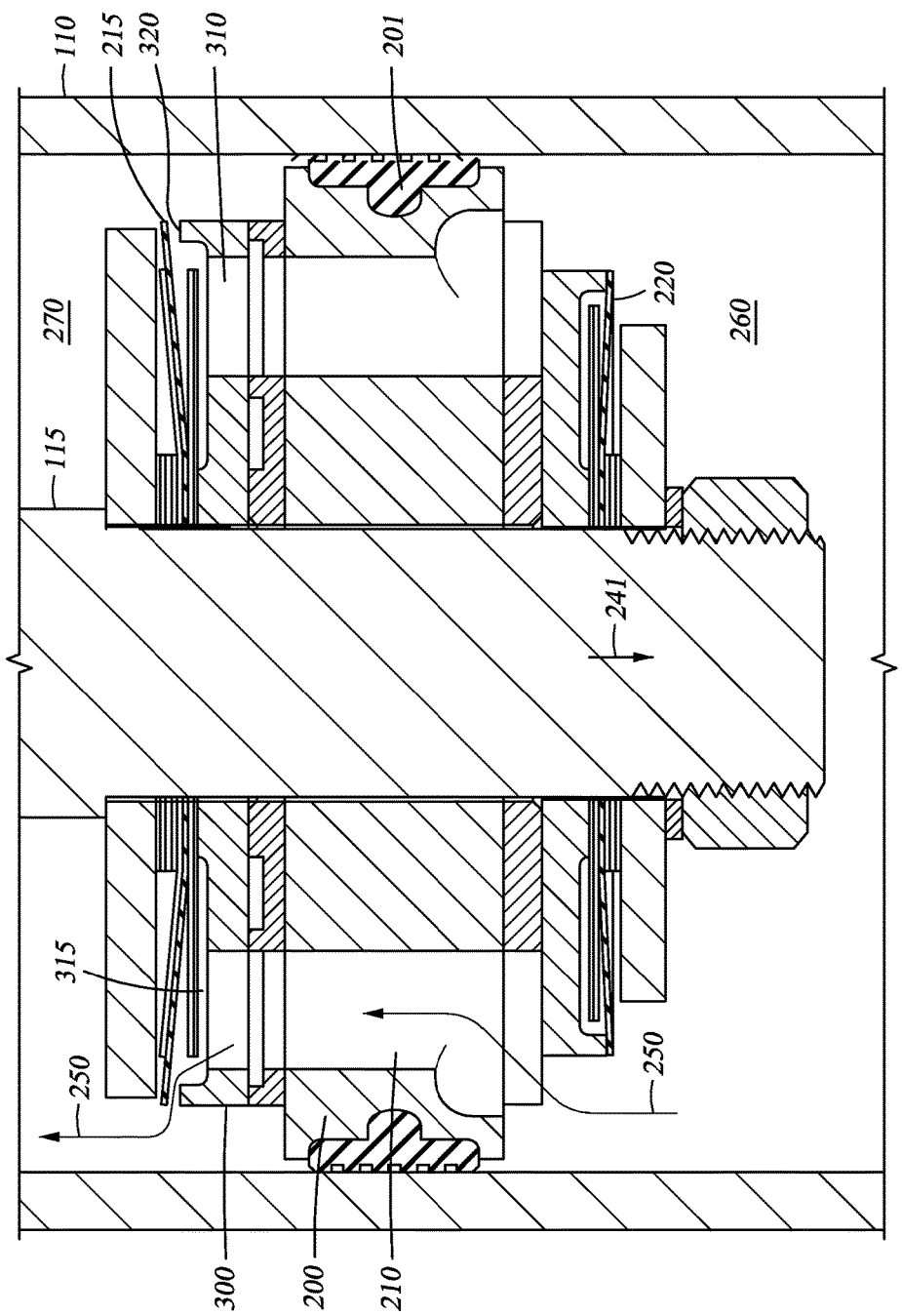
FIG. 8 is a section view of the piston of FIG. 7, taken along a line 8-8.

FIG. 7 is a top view of the piston of FIG. 6, shown installed in a damper body and will be discussed in connection with FIG. 8, a section view of the piston of FIG. 7, taken along a line 8-8 and FIG. 9, a section view of the piston of FIG. 7, taken along a line 9-9. In FIG. 8, the compression plate 300 with its fluid collection area 315 is visible along with shim 215 that is shown in an "open" position to permit shimmed flow 250 to exit the piston into the rebound side 270 of the damper body 110. In the embodiment shown, the shim 215 is "preloaded" due to the fact that the single plate responsible for sealing the compression port 210 is mounted in a fashion that results in its inner edge adjacent rod 115 being lower than its outer edge that seals against sealing edge 320. In one embodiment shown in FIG. 8, additional "large diameter" rebound and/or compression dish shims (circumferential in one embodiment) are added to restrict fluid flow upon opening of the relevant main valve stack, thereby reducing the amount of fluid "dump" or digressive damping that may occur upon valve stack opening. In FIG. 8, the compression ports 210 of the piston 200 are aligned with the compression apertures 310 of the compression plate 300, resulting in a direct flow path 250 between the compression and rebound sides of the damper body.

Figure 9:
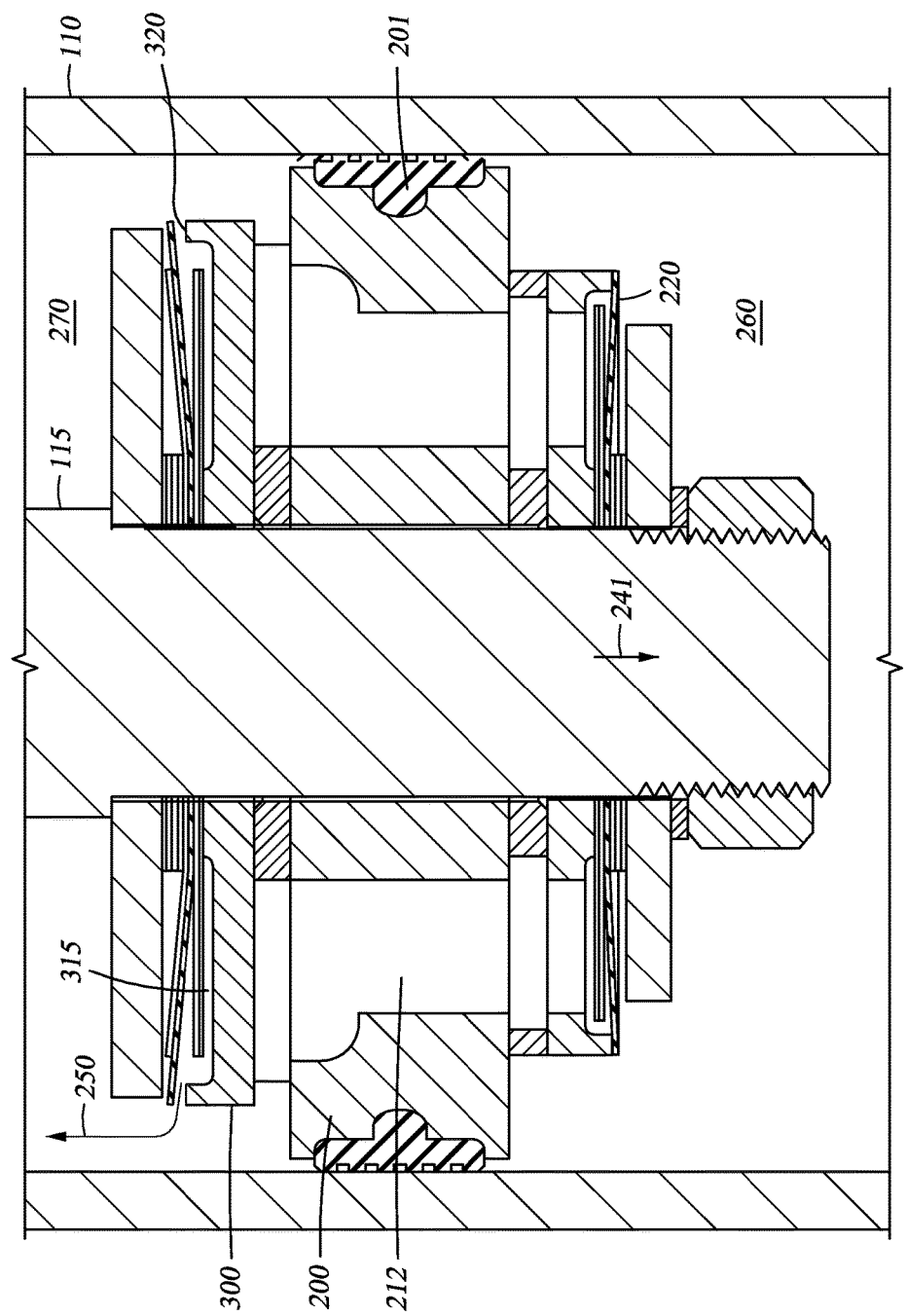
FIG. 9 is a section view of the piston of FIG. 7, taken along a line 9-9.

In FIG. 9, like FIG. 8, the piston 200 is shown in a compressive stroke (241) and shimmed flow is escaping to a rebound side of the damper body 110. However, the ports visible in the piston are the rebound ports 212, not the compression ports 210 and therefore, no fluid path is available therethrough. The fact that compressive flow is escaping in the section view of FIG. 9 illustrates the operation of the compression plate which, with its fluid collection area 315, permits distribution of fluid around an entire perimeter of the shim.

It is noteworthy that while examples herein are discussed in the context or rebound and or compression sides of damping pistons, any of the features disclosed herein may be used solely with compression damping, solely with rebound damping or with both and further any suitable combination of the features discussed herein may be used. For example, one of the bleed valves could be plugged, preventing operation in one direction.

While the foregoing is directed to embodiments of the invention, other and further embodiments of the invention may be devised without departing from the basic scope thereof, and the scope thereof is determined by the claims that follow.

What is claimed is:

1. A vehicle damper comprising:
   a fluid filled cylinder;
   a piston for movement within the cylinder, wherein said piston isolates a first volume in said cylinder from a second volume in said cylinder;
   at least two compression ports formed in said piston;
   at least two rebound ports formed in said piston;
   at least one compression shim at least partially blocking said at least two compression ports;
   at least one rebound shim at least partially blocking said at least two rebound ports; and
   a compression bleed valve disposed within said piston, said compression bleed valve defining a one-directional compression bleed valve flow path disposed within said piston and fluidically coupling said first volume in said cylinder to said second volume in said cylinder, said one-directional compression bleed valve flow path fluidically coupled to said second volume at a location upstream of said at least one compression shim, with respect to fluid flow during a compression movement of said piston, said one-directional compression bleed valve flow path is not encumbered by said at least one compression shim.

2. The vehicle damper of claim 1 further comprising:
a rebound bleed valve disposed within said piston, said rebound bleed valve defining a one-directional rebound bleed valve flow path disposed within said piston and fluidically coupling said second volume in said cylinder to said first volume in said cylinder, said one-directional rebound bleed valve flow path fluidically coupled to said first volume at a location upstream of said at least one rebound shim, with respect to fluid flow during a rebound movement of said piston, said one-directional rebound bleed valve flow path is not encumbered by said at least one rebound shim.

3. The vehicle damper of claim 1, wherein said compression bleed valve includes a threaded outer surface configured to engage with a threaded aperture disposed in said piston such that a threaded connection is formed between said piston and said compression bleed valve.

4. The vehicle damper of claim 2, wherein said rebound bleed valve includes a threaded outer surface configured to engage with a threaded aperture disposed in said piston such that a threaded connection is formed between said piston and said rebound bleed valve.

5. The vehicle damper of claim 1, wherein said compression bleed valve includes a compression orifice having a diameter, said compression orifice disposed in said one-directional compression bleed valve flow path, said diameter of said compression orifice at least partially determining a fluid flow rate through said one-directional compression bleed valve flow path.

6. The vehicle damper of claim 2, wherein said rebound bleed valve includes an rebound orifice having a diameter, said rebound orifice disposed in said one-directional rebound bleed valve flow path, said diameter of said rebound orifice at least partially determining a fluid flow rate through said one-directional rebound bleed valve flow path.

7. The vehicle damper of claim 6, wherein said diameter of said compression orifice is different than said diameter of said rebound orifice.

8. The vehicle damper of claim 1, wherein said compression bleed valve includes a compression check plate biased against the flow of fluid from said first volume to said second volume along said one-directional compression bleed valve flow path.

9. The vehicle damper of claim 2, wherein said rebound bleed valve includes a rebound check plate biased against the flow of fluid from said second volume to said first volume along said one-directional rebound bleed valve flow path.

10. A vehicle damper comprising:
a fluid filled cylinder;
a piston for movement within the cylinder, wherein said piston isolates a first volume in said cylinder from a second volume in said cylinder;
at least two compression ports formed in said piston;
at least two rebound ports formed in said piston;
at least one compression shim at least partially blocking said at least two compression ports;
at least one rebound shim at least partially blocking said at least two rebound ports;
a compression fluid collection portion formed in a compression plate disposed between said at least two compression ports and said at least one compression shim; and
a compression bleed valve disposed within said piston, said compression bleed valve defining a one-directional compression bleed valve flow path disposed within said piston and fluidically coupling said first volume in said cylinder to said second volume in said cylinder, said one-directional compression bleed valve flow path fluidically coupled to said second volume at a location upstream of said at least one compression shim, with respect to fluid flow during a compression movement of said piston, said one-directional compression bleed valve flow path is not encumbered by said at least one compression shim.

11. The vehicle damper of claim 10 further comprising:
a rebound fluid collection portion formed in a rebound plate disposed between said at least two rebound ports and said at least one rebound shim.

12. The vehicle damper of claim 10 further comprising:
a rebound bleed valve disposed within said piston, said rebound bleed valve defining a one-directional rebound bleed valve flow path disposed within said piston and fluidically coupling said second volume in said cylinder to said first volume in said cylinder, said one-directional rebound bleed valve flow path fluidically coupled to said first volume at a location upstream of said at least one rebound shim, with respect to fluid flow during a rebound movement of said piston, said one-directional rebound bleed valve flow path is not encumbered by said at least one rebound shim.

13. The vehicle damper of claim 10, wherein said compression bleed valve includes a threaded outer surface configured to engage with a threaded aperture disposed in said piston such that a threaded connection is formed between said piston and said compression bleed valve.

14. The vehicle damper of claim 12, wherein said rebound bleed valve includes a threaded outer surface configured to engage with a threaded aperture disposed in said piston such that a threaded connection is formed between said piston and said rebound bleed valve.

15. The vehicle damper of claim 10, wherein said compression bleed valve includes a compression orifice having a diameter, said compression orifice disposed in said one-directional compression bleed valve flow path, said diameter of said compression orifice at least partially determining a fluid flow rate through said one-directional compression bleed valve flow path.

16. The vehicle damper of claim 12, wherein said rebound bleed valve includes an rebound orifice having a diameter, said rebound orifice disposed in said one-directional rebound bleed valve flow path, said diameter of said rebound orifice at least partially determining a fluid flow rate through said one-directional rebound bleed valve flow path.

17. The vehicle damper of claim 16, wherein said diameter of said compression orifice is different than said diameter of said rebound orifice.

18. The vehicle damper of claim 10, wherein said compression bleed valve includes a compression check plate biased against the flow of fluid from said first volume to said second volume along said one-directional compression bleed valve flow path.

19. The vehicle damper of claim 12, wherein said rebound bleed valve includes a rebound check plate biased against the flow of fluid from said second volume to said first volume along said one-directional rebound bleed valve flow path.

* * * * *